US010960609B2

United States Patent
Maclachlan

(10) Patent No.: US 10,960,609 B2
(45) Date of Patent: Mar. 30, 2021

(54) METHOD OF MAKING A WINDOW ASSEMBLY HAVING AN ELECTRICALLY HEATED PORTION AND THE WINDOW ASSEMBLY MADE THEREBY

(71) Applicant: PILKINGTON GROUP LIMITED, Lathom (GB)

(72) Inventor: Julia Bronwen Maclachlan, Toledo, OH (US)

(73) Assignee: Pilkington Group Limited, Lathom (GB)

( * ) Notice: Subject to any disclaimer, the term of this patent is extended or adjusted under 35 U.S.C. 154(b) by 611 days.

(21) Appl. No.: 15/330,122

(22) PCT Filed: Feb. 24, 2015

(86) PCT No.: PCT/GB2015/050517
§ 371 (c)(1),
(2) Date: Aug. 11, 2016

(87) PCT Pub. No.: WO2015/128625
PCT Pub. Date: Sep. 3, 2015

(65) Prior Publication Data
US 2017/0231034 A1    Aug. 10, 2017

Related U.S. Application Data

(60) Provisional application No. 61/944,084, filed on Feb. 25, 2014.

(51) Int. Cl.
*B29C 65/14* (2006.01)
*H05B 3/84* (2006.01)
(52) U.S. Cl.
CPC .......... *B29C 65/14* (2013.01); *B29C 65/1403* (2013.01); *H05B 3/84* (2013.01); *H05B 2203/016* (2013.01); *H05B 2203/017* (2013.01)

(58) Field of Classification Search
USPC .................................................. 156/99–109
See application file for complete search history.

(56) References Cited

U.S. PATENT DOCUMENTS

| 4,744,844 A | 5/1988 | Hurst |
| 4,815,198 A | 3/1989 | Ramus |

(Continued)

FOREIGN PATENT DOCUMENTS

| DE | 3936520 A1 | 5/1990 |
| WO | 2010032840 A1 | 3/2010 |
| WO | 2012166339 A1 | 12/2012 |

OTHER PUBLICATIONS

Full Translation of WO2010032840 (Year: 2010).*

(Continued)

*Primary Examiner* — Christopher T Schatz
(74) *Attorney, Agent, or Firm* — Marshall & Melhorn, LLC

(57) ABSTRACT

A method of making a window assembly having an electrically heated portion includes providing a glass pane having a major surface. An electrically conductive material is disposed over at least a portion of the major surface of the glass pane. One or more wire assemblies are attached to the electrically conductive material. A light curable potting material is disposed over the one or more wire assemblies. The potting material covers a portion of each of the one or more wire assemblies and adheres to a portion of the major surface of the glass pane. The light curable potting material flows over the one or more electrical wire assemblies and the major surface of the glass pane such that in 1 minute or less the light curable potting material has an outer surface that is in a parallel relationship with the major surface of the glass pane. Also, the light curable potting material is dimensionally stable in 5 minutes or less.

23 Claims, 8 Drawing Sheets

(56) References Cited

U.S. PATENT DOCUMENTS

| | | | |
|---|---|---|---|
| 6,129,955 A | 10/2000 | Papathomas et al. | |
| 6,765,177 B2 | 7/2004 | Noguchi et al. | |
| 7,200,921 B2 | 4/2007 | Loibl | |
| 2004/0159391 A1* | 8/2004 | Yamaguchi | C09J 5/06 156/106 |
| 2010/0294566 A1* | 11/2010 | Reul | B32B 17/10036 174/94 R |
| 2011/0163569 A1 | 7/2011 | Yoneyama et al. | |
| 2016/0107613 A9 | 4/2016 | Sitterlet | |

OTHER PUBLICATIONS

European Patent Office, The International Search Report and Written Opinion issued in PCT/GB2015/050517, dated May 18, 2015, 11 pages, European Patent Office, Rijswijk, Netherlands.

\* cited by examiner

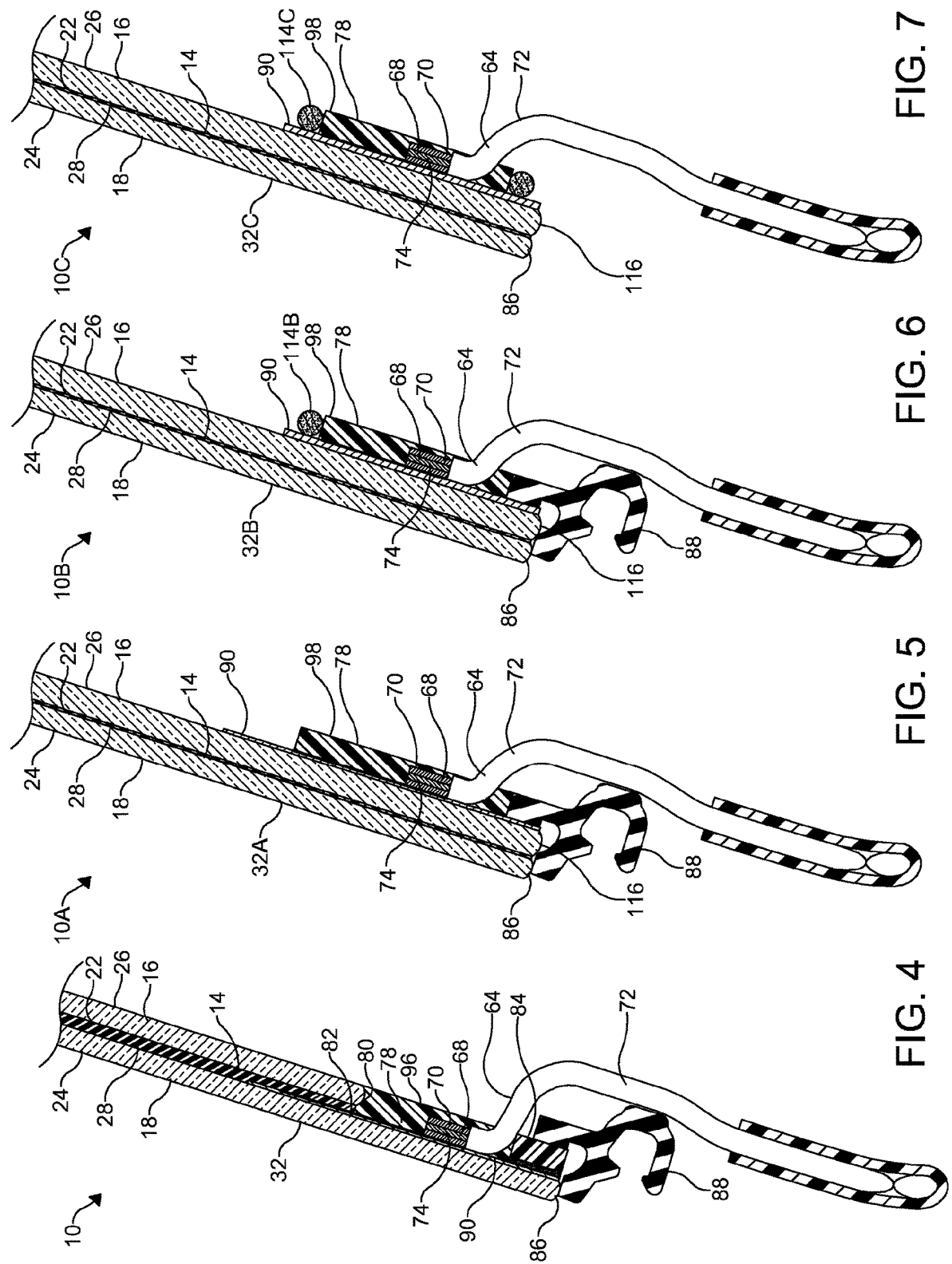

METHOD OF MAKING A WINDOW ASSEMBLY HAVING AN ELECTRICALLY HEATED PORTION AND THE WINDOW ASSEMBLY MADE THEREBY

CROSS-REFERENCE TO RELATED APPLICATION

This application is claiming the benefit, under 35 U.S. C. 119(e), of the provisional application which was granted Ser. No. 61/944,084 and filed on Feb. 25, 2014, the entire disclosure of which is hereby incorporated by reference.

BACKGROUND OF THE INVENTION

The invention relates to a method of making a window assembly. More particularly, the invention relates to a method of making a window assembly having an electrically heated portion and the window assembly made thereby.

Utilizing an electrical system to heat substantially all of the surface area or only selected areas of a vehicle window is known. Typically, the electrical system supplies electricity to the front window (or windshield) and/or the rear window (or backlite) to provide power to heat the windows. One increasingly popular feature for the windshield is a heated area in the lower portion of the windshield where one or more windshield wipers are typically positioned when the wipers are not in operation. Rain, snow, ice, etc. tends to accumulate in the lower portion of the windshield in light of this typical position and so heating of this area is particularly desirable to ensure that the wipers can move freely and operate effectively.

As should be appreciated, the electrical systems utilized to heat the lower portion and/or other portions of the windshield are subject to exposure to potentially damaging environmental constituents such as the aforementioned forms of moisture and extreme temperatures. It is desirable to protect the integrity of these electrical systems and the key components of such systems from such exposure. For example, it is desirable to protect the electrical connections between the components of such systems from exposure to moisture in whatever form.

Known means for protecting the integrity of these electrical systems and the key components thereof have not proven entirely adequate. Additionally, vehicle manufacturers continue to impose more stringent requirements to ensure the reliability of these electrical systems.

Additional challenges to protect the integrity and ensure the reliability of these electrical systems can be encountered when trying to provide a high-volume, low cycle time window manufacturing process.

Thus, it would be desirable to provide a method of making a window assembly having an electrically heated portion that addresses the deficiencies described above. It would also be desirable to provide a window assembly which allows electrical power to be supplied to, for example, a heated portion of the assembly in a reliable manner.

BRIEF SUMMARY OF THE INVENTION

Embodiments of a method of making a window assembly having an electrically heated portion are provided.

In an embodiment, the method comprises providing a glass pane having a major surface. An electrically conductive material is disposed over at least a portion of the major surface of the glass pane. One or more wire assemblies are attached to the electrically conductive material. A light curable potting material is disposed over the one or more wire assemblies. The potting material covers a portion of each of the one or more wire assemblies and adheres to a portion of the major surface of the glass pane. The light curable potting material flows over the one or more electrical wire assemblies and the major surface of the glass pane such that in 1 minute or less the light curable potting material has an outer surface that is in a parallel relationship with the major surface of the glass pane and is dimensionally stable in 5 minutes or less.

Embodiments of a window assembly are also provided. In an embodiment, the window assembly is formed in accordance with the method of claim 1.

BRIEF DESCRIPTION OF THE DRAWINGS

The above, as well as other advantages of the present invention will become readily apparent to those skilled in the art from the following detailed description when considered in the light of the accompanying drawings in which:

FIG. 4 is a partial cross-sectional view of the window assembly of FIG. 2 along line 4-4;

FIG. 5 is a partial cross-sectional view of another embodiment of the window assembly of FIG. 1;

FIG. 6 is a partial cross-sectional view of another embodiment of the window assembly of FIG. 1;

FIG. 7 is a partial cross-sectional view of another embodiment of the window assembly of FIG. 1;

DETAILED DESCRIPTION OF THE INVENTION

Figure 1:
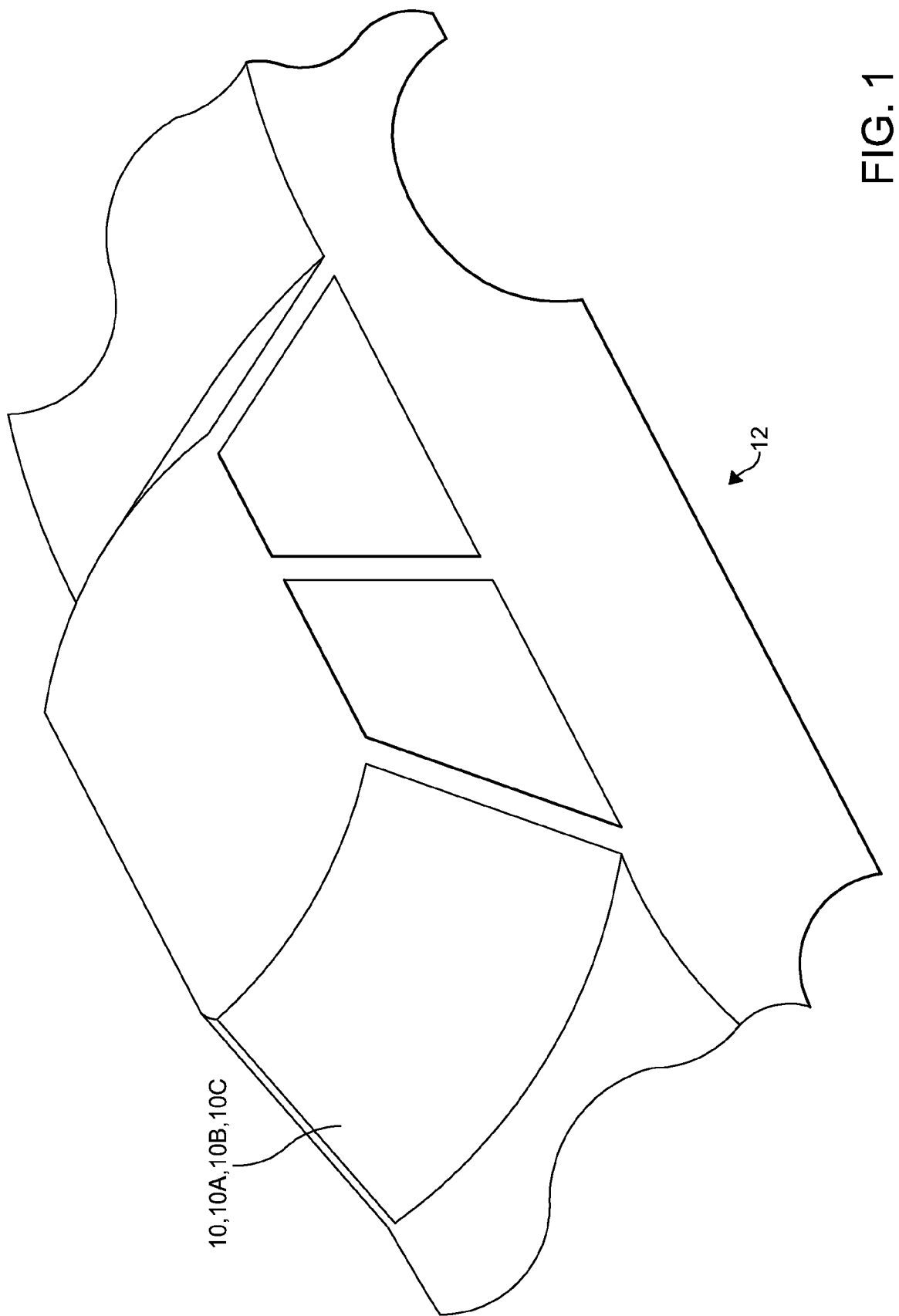
FIG. 1 is a partial perspective view of a vehicle depicting embodiments of a window assembly in accordance with the invention.

It is to be understood that the invention may assume various alternative orientations and step sequences, except where expressly specified to the contrary. It is also to be understood that the methods, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Referring now to the figures, embodiments of a window assembly 10, 10A, 10B, 10C are illustrated in FIG. 1. The window assembly 10, 10A, 10B, 10C will be described in connection with a vehicle 12. It would be understood by one of ordinary skill in the art that the window assembly 10, 10A, 10B, 10C and method of making the window assembly described herein have many applications including, but not limited to, applications for on-highway and off-highway vehicles. Furthermore, it would be understood by one of ordinary skill in the art that embodiments of the invention could have industrial, locomotive, naval and aerospace applications.

The window assembly 10, 10A, 10B, 10C may be installed in any appropriate body opening of the vehicle 12. In certain embodiments, the window assembly 10, 10A, 10B, 10C is installed in a body opening so as to be the front window or windshield of the vehicle 12. However, it should be appreciated that the window assembly could be utilized in another body opening in the vehicle such as, for example, in a side or rear opening of the vehicle.

The window assembly 10, 10A, 10B, 10C may be as described in U.S. patent application Ser. No. 14/321,276, the entire disclosure of which is hereby incorporated by reference.

As best shown in FIGS. 4-7, in certain embodiments, the window assembly 10, 10A, 10B, 10C comprises a polymeric interlayer 14 provided between an inner pane of glass 16 and an outer pane of glass 18. Preferably, the polymeric interlayer 14 is substantially transparent to visible light. The polymeric interlayer 14 is of or includes a suitable polymer such as, for example, polyvinyl butyral (PVB) or another polymer. In certain embodiments like the one shown in FIGS. 5-7, the polymeric interlayer 14 is provided as a sheet of material in a shape substantially matched to that of the inner pane 16 and outer pane 18. In other embodiments like the one shown in FIG. 4, the polymeric interlayer 14 is provided in a shape substantially matched to that of the inner pane 16.

To make the window assembly 10, 10A, 10B, 10C, the inner pane 16 and outer pane 18 are laminated to each other or are otherwise adhered together via the polymeric interlayer 14. Lamination processes known in the art are suitable for adhesion of the inner pane 16 to the outer pane 18 via the polymeric interlayer 14 and forming the window assembly 10, 10A, 10B, 10C. Generally, such lamination processes will include inserting the polymeric interlayer 14 between the inner pane 16 and the outer pane 18 and subjecting the interlayer 14 and panes 16, 18 to a predetermined temperature and pressure to make the window assembly 10, 10A, 10B, 10C. After lamination, it is preferred that the combined thickness of the polymeric interlayer 14 and the inner pane 16 is 2.7 mm or less. More preferably, the combined thickness of the polymeric interlayer 14 and the inner pane 16 is 2.5 mm or less after lamination.

Figure 2:
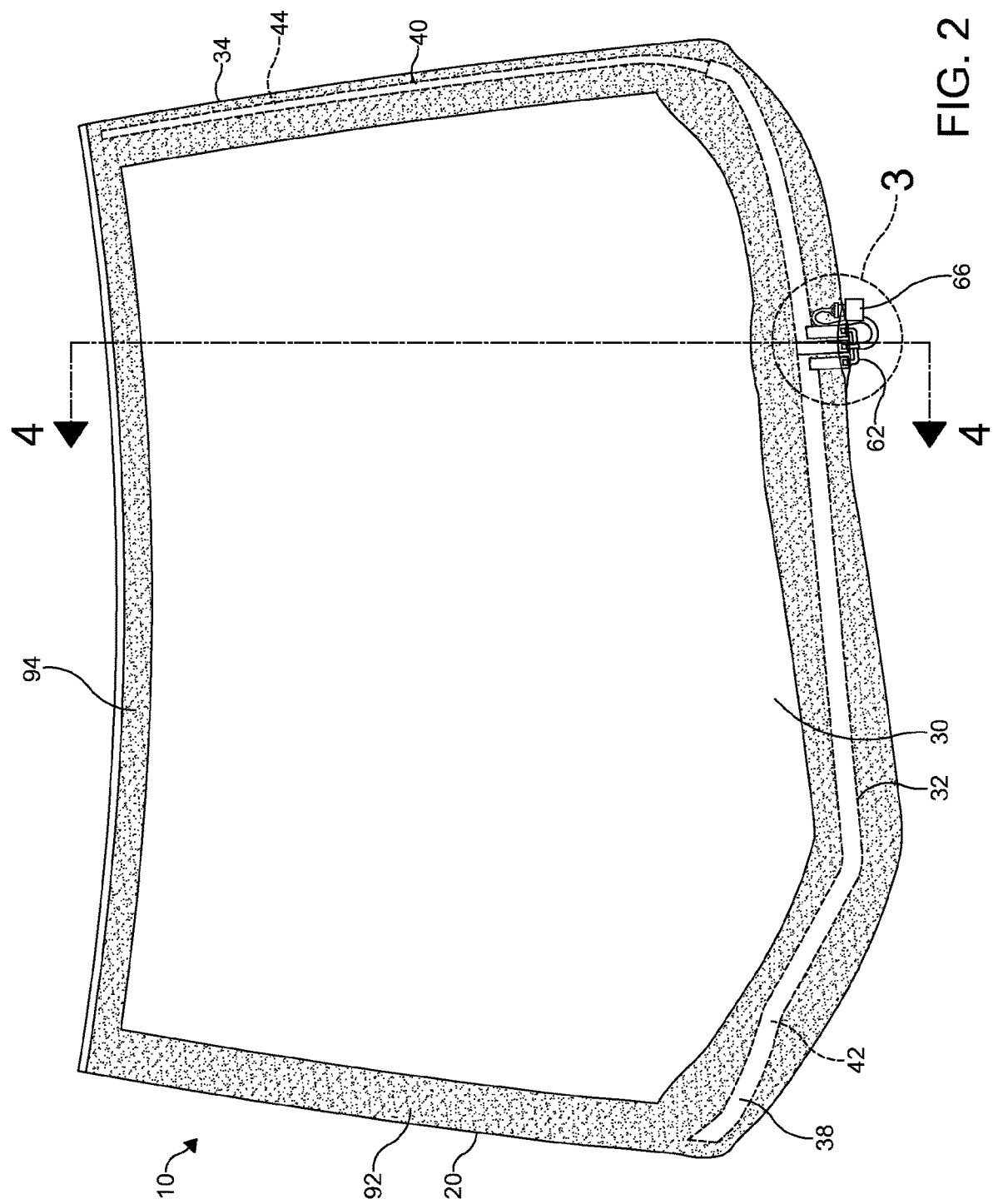
FIG. 2 is a front view of an embodiment of the window assembly of FIG. 1.

Referring now to FIG. 2, the inner pane 16 and outer pane 18 each have a peripheral edge that defines a peripheral edge 20 of the window assembly 10, 10A, 10B, 10C. The inner pane 16 and outer pane 18 each have a first major surface 22, 24 and a second major surface 26, 28. Preferably, the first major surface 24 of the outer pane 18 faces the exterior environment, the second major surface 26 of the inner pane 16 faces the interior of the vehicle 12 and the second major surface 28 of the outer pane 18 and the first major surface 22 of the inner pane 16 face each other.

Preferably, when installed, the window assembly 10, 10A, 10B, 10C is proximate a windshield wiper system (not depicted). The windshield wiper system comprises one or more windshield wipers which clean the window assembly 10, 10A, 10B, 10C and remove moisture from the assembly to allow the driver of the vehicle to clearly view the roadway ahead. Under certain conditions, the windshield wipers help to keep the window assembly 10, 10A, 10B, 10C free from ice, slush, rain and the like. However, under conditions where ice, slush and the like may form, the windshield wipers are susceptible to freezing to the first major surface 24 of the outer pane 18 while in a rest position. Thus, it has been found to be desirable to heat a portion of the window assembly 10, 10A, 10B, 10C where the wipers rest to prevent the wipers from freezing thereto when the wipers are at rest. Also, it has been found to be desirable to heat portions of the window assembly 10, 10A, 10B, 10C where the wipers deposit ice, slush, and the like after removing the aforementioned from obstructing the view of the driver. The aforementioned portions 30 of the window assembly 10, 10A, 10B, 10C can be heated as described below if desired and will be referred to hereinafter as the "wiper rest area."

The wiper rest area 30 is provided on the first major surface 24 of the outer pane 18 and in one or more edge portions 32, 32A, 32B, 34 of the window assembly 10, 10A, 10B, 10C so that when the wipers are at rest or when ice, slush or the like is deposited the driver's view is only minimally obstructed. For example, the wiper rest area 30 may comprise a lower edge portion 32, 32A, 32B or a side edge portion 34 of the window assembly 10, 10A, 10B, 10C. Preferably, the wiper rest area 30 comprises the side edge portion 34 of the window assembly 10, 10A, 10B, 10C adjacent the driver's side of the vehicle. In another embodiment, the wiper rest area 30 comprises a plurality of edge portions 32, 32A, 32B, 34 of the window assembly 10, 10A, 10B, 10C. For example, the wiper rest area 30 may comprise the lower edge portion 32, 32A, 32B and side edge portion 34 of the window assembly 10, 10A, 10B, 10C.

Heating of the wiper rest area 30 can be accomplished by any suitable method. An example of a suitable method for heating the wiper rest area is described in U.S. Pat. No. 6,137,086, which is incorporated by reference herein in its entirety. It is preferred that heating of the wiper rest area 30 is accomplished by electrical resistance heating. The wiper rest area 30 can be heated by providing electrical resistance heating on any of the major surfaces 22, 24, 26, 28 of the inner pane 16 or the outer pane 18. However, as illustrated best in FIGS. 4-7, it is preferred to heat the wiper rest area 30 by providing electrical resistance heating on the second major surface 26, 28 of the of the inner pane 16 or the outer pane 18.

Preferably, electrical resistance heating of the wiper rest area 30 is achieved by providing an electrically conductive material adjacent the wiper rest area 30. Preferably, the electrically conductive material is in the form of one or more electrically conductive traces 36. The conductive traces 36 are disposed over at least a portion of one of the major surfaces 22, 24, 26, 28 of the inner pane 16 or the outer pane 18 and extend along one or more edge portions 38, 40 of either the inner pane 16 or the outer pane 18. For example, the conductive traces 36 may be disposed over the second major surface 26, 28 of the of the inner pane 16 or the outer pane 18 and extend along a lower edge portion 38 of the inner pane 16 or the outer pane 18 or along a driver's side edge portion 40 of the inner pane 16 or the outer pane 18. Preferably, the conductive traces 36 extend along both the lower edge portion 38 and driver's side edge portion 40 of the inner pane 16 or the outer pane 18.

The conductive traces 36 can be formed by a printing process. However, other processes may be utilized to form the conductive traces 36 and are suitable for use in making the window assembly 10, 10A, 10B, 10C. Such processes include deletion, sputtering or silk-screening processes or the like. The conductive traces 36 can be formed from any electrically conductive material which promotes electrical conductance and has an electrical resistance so as to generate heat. For example, the conductive traces 36 may be formed from an electrically conductive material such as a silver-containing ceramic frit.

The number of conductive traces 36 provided can vary depending on the amount of heating that is desired and the size of the wiper rest area 30. Preferably, the conductive traces 36 are spaced apart from each other and are provided in a grid-like pattern 42, 44. Depending on the size of the wiper rest area 30, a plurality of grid-like patterns may be provided. For example, as shown in FIG. 2, two grid-like patterns 42, 44 are provided to heat the wiper rest area.

Figure 3:
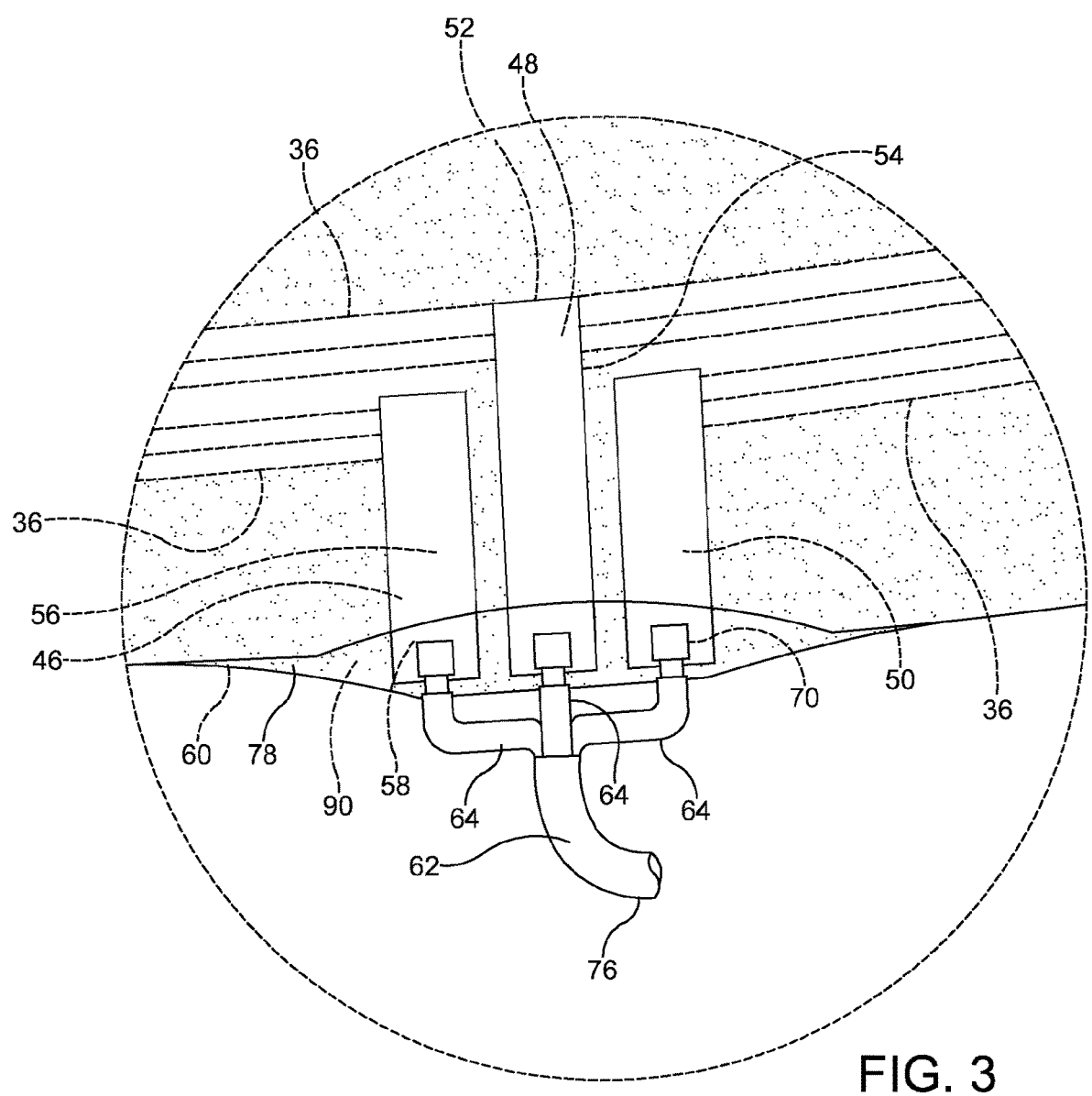
FIG. 3 is an enlarged view of a portion of the window assembly of FIG. 2.

As shown best in FIG. 3, the conductive traces 36 are electrically connected at each end to a busbar 46, 48, 50. In certain embodiments, the conductive traces 36 may be employed in series. However, in other embodiments, the conductive traces may be employed in parallel. As illustrated, each busbar 46, 48, 50 may be provided in a generally perpendicular relationship and formed in a unitary manner with one or more conductive traces 36.

Each busbar 46, 48, 50 is formed from an electrically conductive material and is electrically conductive. The busbars 46, 48, 50 can be formed in any manner and from any material which promotes electrical conductance. In certain embodiments, the busbars 46, 48, 50 are formed by the same process and from the same material utilized to form the conductive traces 36. For example, the busbars 46, 48, 50 may be formed by a printing process and from an electrically conductive material such as a silver-containing ceramic frit.

As illustrated, a plurality of busbars 46, 48, 50 is provided for the embodiments of the window assembly 10, 10A, 10B, 10C. Preferably, the busbars 46, 48, 50 are disposed over the same major surface 22, 24, 26, 28 of the inner pane 16 or the outer pane 18 that the conductive traces 36 are disposed over. Preferably, the busbars 46, 48, 50 are disposed over the second major surface 26, 28 of the inner pane 16 or the outer pane 18. In an embodiment, three busbars 46, 48, 50 are disposed on the second major surface 28 of the outer pane 18 of the window assembly 10. Alternatively, three busbars 46, 48, 50 may be disposed on the second major surface 26 of the inner pane 16 of the window assembly 10A, 10B, 10C. In these embodiments, a center busbar 48 is located between two outer busbars 46, 50. The busbars 46, 48, 50 are arranged on the second major surface 26, 28 of the inner pane 16 or the outer pane 18 in a spaced apart and parallel relationship with each other. The center busbar 48 is electrically connected to each of the outer busbars 46, 50 in, for example, a series circuit via the grid-like patterns 42, 44 of the conductive traces 36.

Each busbar 46, 48, 50 is of a width 52 and a length 54. Referring back to FIG. 3, the widths 52 of the busbars 46, 48, 50 may be substantially similar. Preferably, the width 52 of each busbar 46, 48, 50 is selected to minimize the heat generated from the busbars 46, 48, 50 as electrical current travels through them. Thus, the width 52 of each busbar 46, 48, 50 is preferably greater than the widths of the conductive traces 36 connected to it. In certain embodiments like those illustrated in FIGS. 2-4, each busbar 46, 48, 50 is of a length 54 such that a first portion 56 of each busbar 46, 48, 50 is disposed between the second major surface 28 of the outer pane 18 and the polymeric interlayer 14. Also, in these embodiments, each busbar 46, 48, 50 is of a length 54 such that a second portion 58 of each busbar 46, 48, 50 extends into a cutout portion 60 of the window assembly 10. The second portion 58 of each busbar 46, 48, 50 is utilized to electrically connect the busbar 46, 48, 50 to a connector assembly 62.

As shown best in FIGS. 2-4, the connector assembly 62 comprises a plurality of wire assemblies 64 and a wire connector 66. The wire connector 66 allows a supply (not depicted) of electrical power to be communicated to the connector assembly 62. Each wire assembly 64 comprises an electrically conductive wire 68 and a terminal connector 70 attached thereto. On an end, each wire assembly 64 via the conductive wire 68 is electrically connected to the wire connector 66. On an opposite end, each wire assembly 64 via the terminal connector 70 is electrically connected to and attached to a busbar 46, 48, 50. Electrical power is communicated from the supply to the wire connector 66 and from the wire connector 66 to the wire assemblies 64. Electrical power is communicated from the wire assemblies 64 through the conductive wires 68 and terminal connectors 70 to the busbars 46, 48, 50 and from the busbars 46, 48, 50 to the conductive traces 36 to heat the wiper rest area 30 to a desired temperature.

Preferably, each conductive wire 68 is flexible and a major portion of each conductive wire 68 is covered by an insulating sheath 72. The insulating sheath 72 prevents the conductive wire 68 from communicating electrical power to an undesired portion of the vehicle 12 such as an electrically conductive portion of the vehicle adjacent the window assembly 10, 10A, 10B, 10C. An unsheathed or exposed portion 74 of each conductive wire 68 is attached in a robust manner to a terminal connector 70 adjacent an end of the wire 68. Preferably, the terminal connectors 70 are attached to the exposed portions 74 of the conductive wires 68 mechanically such as, for example, by a crimping process. However, other methods of attaching the terminal connectors 70 to the exposed portions 74 of the conductive wires 68 may be utilized to form the wire assemblies 64. In an embodiment, each terminal connector 70 is as described in U.S. patent application Ser. No. 14/321,276. Also, each terminal connector 70 is electrically connected and attached to a busbar 46, 48, 50 as described in U.S. patent application Ser. No. 14/321,276. Preferably, each terminal connector 70 is attached to a busbar 46, 48, 50 via a soldering method.

A cylindrical tube member 76 may be disposed around the wire assemblies 64 to maintain the spacing and orientation of the wires 68 relative to each other. The cylindrical tube member 76 is provided between and spaced apart from the wire connector 66 and the terminal connectors 70. Preferably, the cylindrical tube member 76 is made from an insulating material such as, for example, a polymeric material. However, other insulating materials which can be provided in a cylindrical shape and offer a degree of resiliency could also be utilized to form the cylindrical tube member.

As illustrated in FIGS. 2-4, in certain embodiments the window assembly 10 includes the cutout portion 60. In these embodiments, a terminal connector 70 is attached to the second portion 58 of a busbar 46, 48, 50 in the cutout portion 60 and a layer of potting material 78 is provided thereover in the cutout portion 60. The cutout portion 60 is located proximate a peripheral edge 20 of the window assembly 10. Preferably, the cutout portion 60 is located in the lower edge portion 32 of the window assembly 10. The cutout portion 60 is formed in an edge 80, 82 of the inner pane 16 and polymeric interlayer 14 by removing portions of the inner pane 16 and the polymeric interlayer 14.

The cutout portion 60 can be of any desired shape. For example, the cutout portion 60 could be of a shape which is generally circular, hemispherical, oval, rectangular, square, triangular, or another polygonal shape. However, as shown best in FIG. 3, it may be preferred that the cutout portion 60 is of a generally pointed elliptical, partially elliptical or another generally pointed and/or elliptical shape.

In certain embodiments, a spacer 84 may be provided in the cutout portion 60 along a lower edge 86 of the outer pane 18. In certain embodiments, a portion of a molding member 88 is attached to the spacer 84. The spacer 84 is attached to the window assembly 10 via bonding to the second major surface 28 of the outer pane 18. Bonding the spacer 84 to the second major surface 28 of the outer pane 18 can be achieved via an adhesive or another suitable method.

In certain embodiments, the molding member 88 is disposed around at least a portion of the peripheral edge 20 of the window assembly 10, 10A, 10B. Preferably, the molding member 88 is formed from a polymeric material that can be molded onto or otherwise affixed around the peripheral edge 20 of the window assembly 10, 10A, 10B. The molding member 88 provides a seal about the body opening of the vehicle 12 that the assembly 10, 10A, 10B is installed in. The molding member 88 may be disposed against a water box cover (not depicted) when the window assembly 10, 10A, 10B is installed in the body opening. In order to achieve an aesthetic appearance, there is typically very little space left between the molding member 88 and the sheet metal defining the body opening. Nonetheless, it is desirable to utilize the space to, for example, provide the wire assemblies 64 therethrough.

In certain embodiments, the conductive traces 36 and busbars 46, 48, 50 are formed on a frit layer 90. The frit layer 90 is provided to prevent viewing of certain portions of the window assembly 10, 10A, 10B, 10C and the interior of the vehicle 12 from the exterior of the vehicle 12. The frit layer 90 may be of any desired color, but is often varying shades of grey or black.

The frit layer 90 is disposed on the same major surface 22, 24, 26, 28 of the inner pane 16 or the outer pane 18 that the conductive traces 36 and busbars 46, 48, 50 are disposed over. A second frit layer (not depicted) may be disposed on another major surface of the inner pane or the outer pane. The frit layer 90 separates the conductive traces 36 and busbars 46, 48, 50 from the major surface 22, 24, 26, 28 of the inner pane 16 or the outer pane 18 that the conductive traces 36 and busbars 46, 48, 50 are disposed over. In certain embodiments, the frit layer 90 extends around the edge portions 38, 40, 92, 94 of the glass pane 16, 18 it is disposed on. However, it should be appreciated that the frit layer 90 may be located in individual edge portions of the glass pane it is disposed on. Preferably, the frit layer 90 is formed of a ceramic material. The ceramic frit material is disposed in the edge portions 38, 40, 92, 94 of either the inner pane 16 or the outer pane 18 by, for example, a screen printing method and then fired so as to cause the frit layer to be substantially permanently bonded to the major surface 22, 24, 26, 28 it is disposed on.

The window assembly 10, 10A, 10B, 10C comprises the potting material 78. While the term "potting" material will be used herein, for certain embodiments of the window assembly 10, 10A, 10B, 10C the terms "casting" or "encapsulation" may be utilized instead. Portions of the window assembly 10, 10A, 10B, 10C utilized to communicate electrical power and heat the wiper rest area 30 are protected from degradation and electrically insulated by disposing the potting material 78 thereover. In an embodiment, the potting material 78 is disposed over a portion of a major surface 22, 24, 26, 28 of a glass pane 16, 18 and a portion of the frit layer 90 near the connections between the busbars 46, 48, 50 and the wire assemblies 64 such that a portion of each of the wire assemblies 64 is covered by the potting material 78. Preferably, the potting material 78 is disposed over at least a portion of each busbar 46, 48, 50 and each terminal connector 60. The potting material 78 may also be disposed over a portion of each conductive wire 68.

Preferably, the potting material 78 is disposed on the second major surface 26, 28 of the inner pane 16 or the outer pane 18. When the potting material 78 is provided on the second major surface 28 of the outer pane 18 as is shown in FIG. 4, the potting material 78 may be provided at a thickness such that it has an outer surface 96 which does not extend beyond the second major surface 26 of the inner pane 16. In an embodiment, the potting material 78 and the terminal connectors 70 are of thicknesses that result in a combined thickness that is less than or equal to the combined thickness of the polymeric interlayer 14 and inner pane 16. In other embodiments (not depicted) where the potting material has been provided on the second major surface of the outer pane, the potting material may be provided at a thickness such that it has an outer surface which extends beyond the second major surface of the inner pane. When the potting material 78 is provided on the second major surface 26 of the inner pane 16 as is shown in FIGS. 5-7, the layer of potting material 78 forms an outer surface 98 of the window assembly 10A, 10B, 10C which separates a portion of the second major surface 26 of the inner pane 16 from sheet metal which at least partially defines the vehicle body opening into which the window assembly 10A, 10B, 10C is installed.

The potting material 78 is supplied to the window assembly 10, 10A, 10B, 10C from a source of potting material 100. In certain embodiments like the ones illustrated in FIGS. 8-9, the potting material 78 can be automatically supplied from the source of potting material 100 to the window assembly 10, 10A, 10B, 10C via a pump 102 and one or more delivery lines 104. In other embodiments (not depicted), the potting material can be supplied to the window assembly via a manually operated cartridge and dispenser assembly.

Prior to supplying the potting material 78 to the window assembly 10, 10A, 10B, 10C, the inner pane 16 and the outer pane 18 may be delivered to a fixture 106. The fixture 106 includes one or more holding members 108 for positioning the panes 16, 18 relative to the source of potting material 100 and a source of light 110. Preferably, the holding members 108 are retractable can move toward or away from the panes 16, 18. For example, the holding members 108 may move toward the panes 16, 18 prior to the potting material 78 being disposed on the window assembly 10, 10A, 10B, 10C. In another embodiment, the holding members 108 may move away from the panes 16, 18 after the potting material 78 has been disposed on the window assembly 10, 10A, 10B, 10C and cured. As used herein, the term "cured" as it applies to the potting material refers to the potting material being dimensionally stable. Thus, after the potting material 78 has cured, the window assembly 10, 10A, 10B, 10C can, for example, be placed and held in a vertical orientation without observing potting material 78 flowing.

The potting material 78 adheres to the portions of the window assembly 10, 10A, 10B, 10C it is disposed over. After the potting material 78 is disposed over the window assembly 10, 10A, 10B, 10C as described above and is cured, a seal is provided over and around the portions of the window assembly 10, 10A, 10B, 10C the potting material was disposed over including the electrical connections between the busbars 46, 48, 50 and the wire assemblies 64. The seal prevents the ingress of moisture and, preferably, is robustly adhered to a portion of the major surface 22, 24, 26, 28 of the glass pane 16, 18 it is provided over. By preventing the ingress of moisture, the seal protects portions of the window assembly 10, 10A, 10B, 10C utilized to heat the wiper rest area 30 from degradation and failure. The seal maintains its physical properties, including its resistance to moisture, even under severe or accelerated weathering conditions.

Additionally, when the window assembly 10, 10A, 10B, 10C is installed in a body opening of the vehicle 12, the potting material 78 separates the terminal connectors 60 from the sheet metal defining the body opening. Preferably, the height of each terminal connector 70 is such that the layer of potting material 78 can be provided over the terminal connectors 70 at a thickness which protects the terminal connectors from degradation, electrically insulates the terminal connectors 70 from the aforementioned sheet metal and provides a window assembly 10, 10A, 10B, 10C with a pleasing appearance.

In certain embodiments, adhesion of the potting material 78 to the glass pane 16, 18, frit layer 90, electrically conductive material 36, 46, 48, 50 and wire assemblies 64 is promoted by application of a primer prior to disposing the potting material 78 over the aforementioned portions of the window assembly 10, 10A, 10B, 10C. Known processes for applying a primer are suitable for use in the method described herein. Preferably, the primer is disposed directly on the inner pane 16 or the outer pane 18, the frit layer 90, the electrically conductive material 36, 46, 48, 50 and each wire assembly 64 to promote adhesion of the potting material 78 thereto. Also, the primer is selected to be adhesively compatible with the potting material 78. Preferred primers are, for example, silane-based. The silane-based primers may be used alone or in combination with isocyanate-based primers or primers which combine two components. Particularly preferred primers include those by Dow Chemical sold under the trademarks Dow BETASEAL™ 43518 and Dow BETASEAL™ 43520A. The primer may be curable by chemical reaction between components and/or by another mechanism. Preferably, the primer is dry in 1 minute or less.

In order to utilize the method described herein in a high volume window manufacturing environment, it is desired that the potting material 78 is cured in a short period of time. It has been found that by utilizing a light cure mechanism the dimensional stability of the potting material 78 can be achieved quickly. Therefore, the potting material 78 comprises a light cure mechanism. As such, the potting material 78 may be referred to hereinafter as a "light curable potting material." As used herein, the term "cure mechanism" as it applies to the light curable potting material 78 refers to the process by which dimensional stability is initiated. Known light initiated cure mechanisms such as, for example, the mechanisms sold under the trademarks IRGACURE® and DAROCUR® by BASF are suitable for use in the light curable potting material 78. In an embodiment, the light cure mechanism includes a material which absorbs light to initiate curing of the light curable potting material 78. Such materials may be an a-hydroxyketone, benzophenone or the like.

The light curable potting material 78 is cured by exposure to light provided by the source of light 110. Upon exposure to the light, light is absorbed which initiates a reaction allowing the light curable potting material 78 to be cured. In certain embodiments, wavelengths of light in a certain portion of the electromagnetic spectrum are absorbed by the light curable potting material 78 and initiate the reaction that allows the light curable potting material 78 to be cured. In these embodiments, the source of light 110 can be tuned to provide the wavelengths of light that initiate the reaction. For example, in certain embodiments, wavelengths of light in the ultraviolet (UV) light portion of the electromagnetic spectrum initiate the reaction that allows the light curable potting material 78 to be cured. In these embodiments, the source of light 110 provides wavelengths of UV light in the range of 10-400 nm of the electromagnetic spectrum. In other embodiments, wavelengths of light in the visible light portion of the electromagnetic spectrum initiate the reaction that allows the light curable potting material 78 to be cured. In these embodiments, the source of light 110 provides wavelengths of visible light in the range of 400-780 nm of the electromagnetic spectrum. In still other embodiments, wavelengths of light in both the UV and visible light portions of the electromagnetic spectrum initiate the reaction that allows the light curable potting material 78 to be cured. In these embodiments, the source of light 110 can provide wavelengths of UV and visible light in the range of 10-780 nm of the electromagnetic spectrum.

Figure 8:
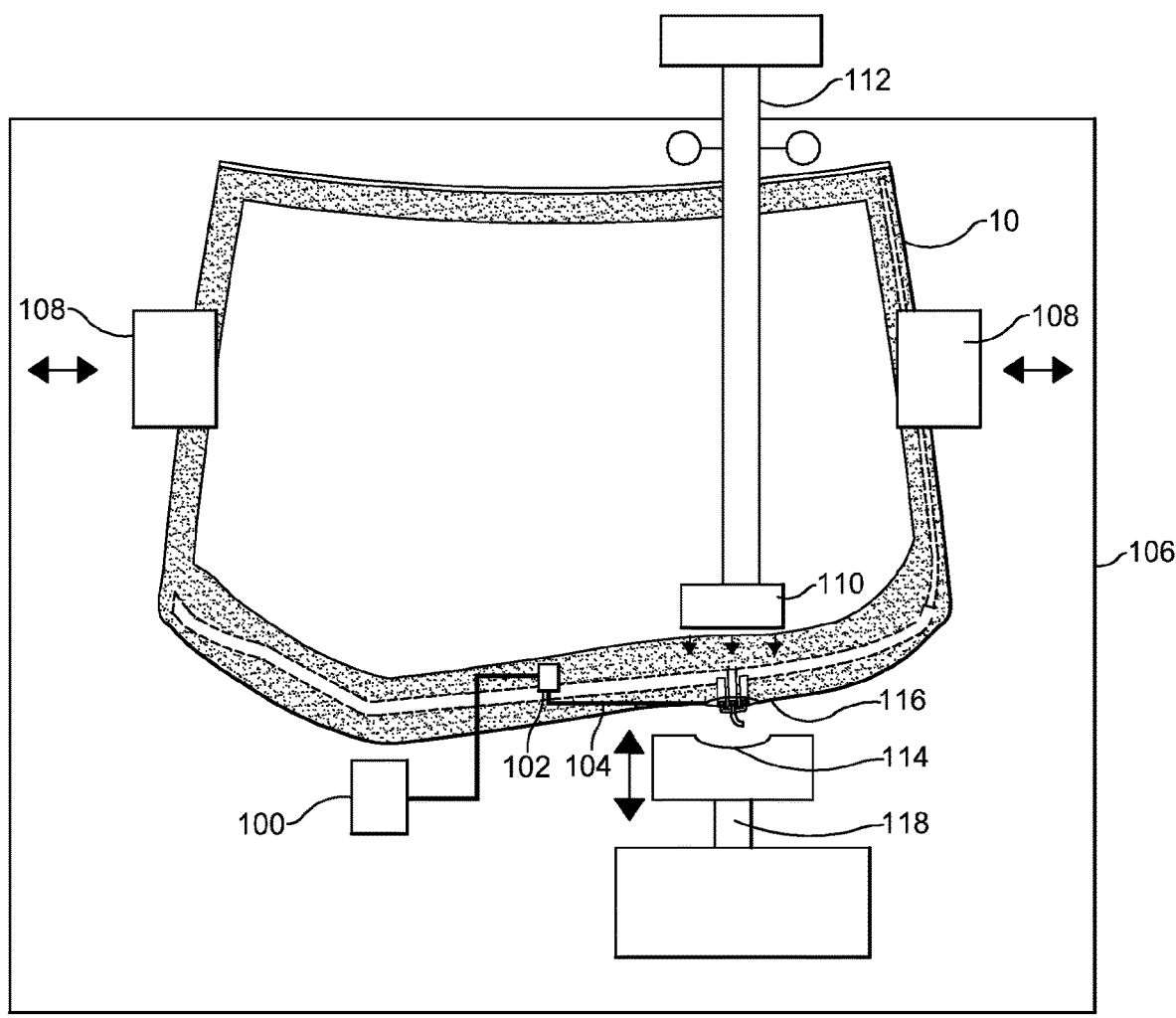
FIG. 8 is a plan view of an embodiment of a fixture utilized in the method of making certain embodiments of the window assembly of FIG. 1 in accordance with the invention.
Figure 9:
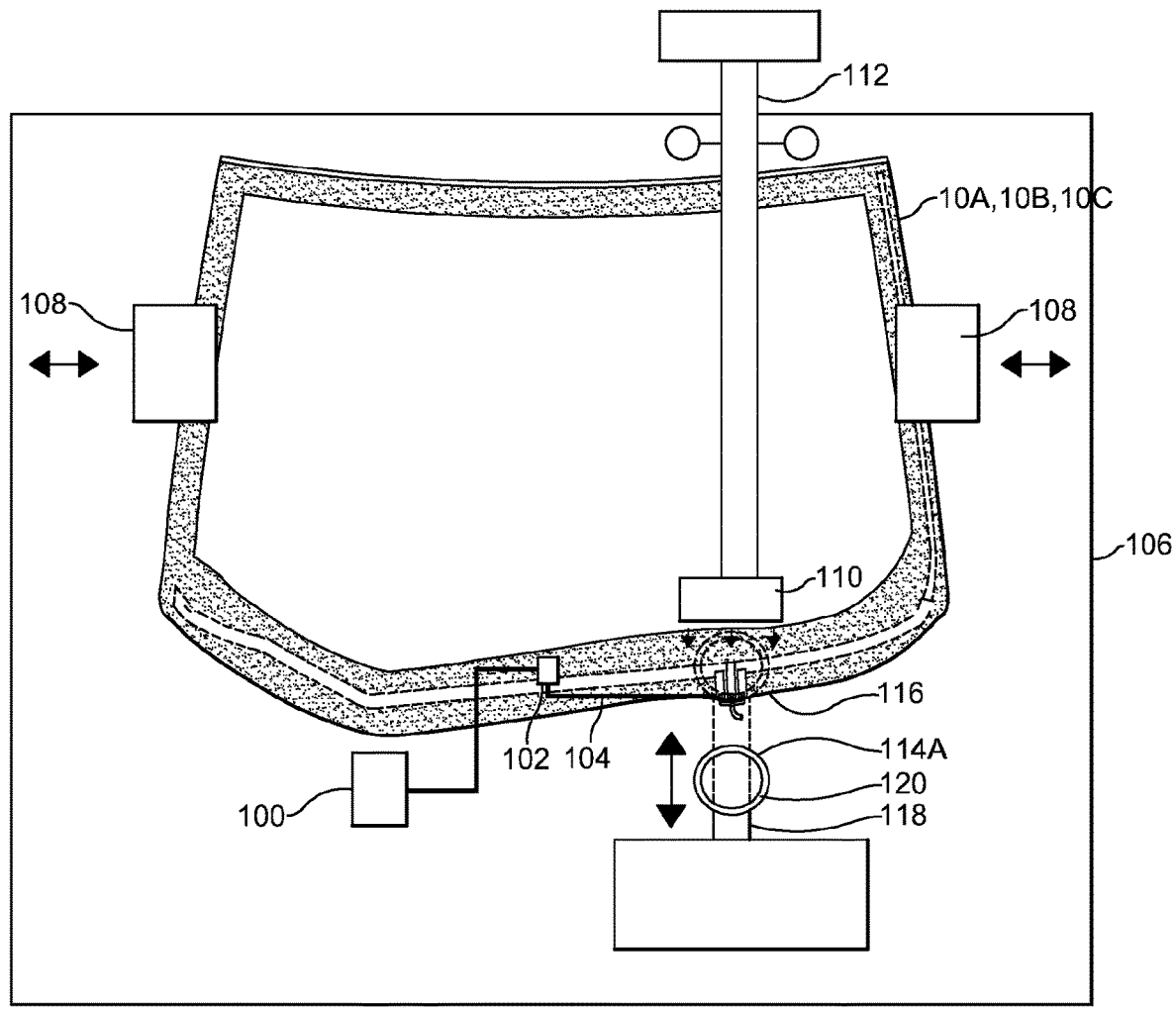
FIG. 9 is a plan view of another embodiment of a fixture utilized in the method of making certain embodiments of the window assembly of FIG. 1 in accordance with the invention.

The source of light 110 is provided adjacent the major surface 22, 24, 26, 28 of the glass pane 16, 18 having the light curable potting material 78 disposed thereover. As shown in FIGS. 8 and 9, the source of light 110 may be attached to a swing arm 112. The swing arm 112 is moveable relative to the fixture 106 to allow the panes 16, 18 to be positioned prior to exposing the potting material 78 to light or removed from the fixture 106 after exposing the potting material 78 to light. The light curable potting material 78 may be exposed to light provided by the source of light 110 for a predetermined period of time. In an embodiment, the light curable potting material 78 is exposed to light provided by the source of light 110 for 60 seconds or less. More preferably, the light curable potting material 78 is exposed to light provided by the source of light 110 for 30 seconds or less.

As noted above, the light curable potting material 78 comprises a light initiated cure mechanism. Advantageously, utilizing the light initiated cure mechanism allows the potting material 78 to be cured in a predetermined period of time and the method to be suitable for a high volume window manufacturing. In certain embodiments, the light initiated cure mechanism and the source of light 110 are selected so that the light curable potting material 78 is cured in a short period of time. For example, in an embodiment, the light initiated cure mechanism and the source of light 110 can be selected so that the light curable potting material is dimensionally stable in 5 minutes or less. Preferably, the light curable potting material 78 is dimensionally stable in 2 minutes or less. More preferably, the light curable potting material 78 is dimensionally stable in 1 minute or less. According to the method described herein, the period of time required for the light curable potting material 78 to be cured can be reduced by selection of the cure mechanism(s), selection of the material included in the light cure mechanism which absorbs light to initiate the reaction that allows the light curable potting material 78 to be cured, tuning the wavelengths of light provided by the source of light 110 as described above, and/or by increasing the intensity of the light provided by the source of light 110 by increasing the power to the source of light 110.

In addition to the light curable potting material 78 being dimensionally stable in a short period of time, the light curable potting material 78 exhibits certain advantageous properties after being cured. For example, in certain embodiments, the light curable potting material 78 can be stretched beyond its normal state without breaking. In one such embodiment, the light curable potting material 78 exhibits an elongation at break of 100% or more. More preferably, an elongation at break of 200% or more is exhibited by the light curable potting material 78. Also, it has been discovered that, if the light curable potting material 78 is overly stiff after being cured, the light curable potting material 78 may cause the inner pane 16 or the outer pane 18 to break or the frit layer 90 to be pulled off of a pane 16, 18 when exposed to certain ambient temperature conditions. Thus, in certain embodiments, the light curable potting material 78 exhibits a stiffness or modulus of elasticity which, when exposed to low ambient temperatures, does not break the inner pane 16 or outer pane 18 or pull off the frit layer 90. For example, after being cured, the light curable potting material 78 exhibits a modulus of elasticity (Young's modulus) of 500 MPa or less when exposed to an ambient temperature of −40° C. Preferably, the light curable potting material 78 exhibits a modulus of elasticity (Young's modulus) of 200 MPa or less when exposed to an ambient temperature of −40° C. More preferably, the light curable potting material 78 exhibits a modulus of elasticity (Young's modulus) of 100 MPa or less when exposed to an ambient temperature of −40° C.

Prior to being cured, the light curable potting material 78 is self-leveling. Thus, after the light curable potting material 78 is disposed as described above, it flows over the one or more electrical wire assemblies 64 and a major surface 22, 24, 26, 28 of a glass pane 16, 18 and the outer surface of the light curable potting material is provided in a parallel relationship with the major surface 22, 24, 26, 28 of the pane 16, 18 it is disposed over. Preferably, the outer surface 96, 98 of the potting material 78 is in a parallel relationship with the second major surface 26, 28 of the inner pane 16 and/or the outer pane 18. It is preferred the outer surface 96, 98 of the light curable potting material 78 is in a parallel relationship with the major surface 22, 24, 26, 28 in 1 minute or less. More preferably, the outer surface 96, 98 of the light curable potting material 78 is substantially flat in 1 minute or less. It is preferred that the light curable potting material 78 has a viscosity that helps it to self-level in a quick and efficient manner. For example, in certain embodiments, the light curable potting material 78 has a viscosity of less than 40,000 centipoises before being exposed to the source of light 110. Preferably, the light curable potting material 78 has a viscosity of 20,000 centipoises or less before it is exposed to the source of light 110. More preferably, the light curable potting material 78 has a viscosity of 10,000 centipoises or less before it is exposed to the source of light 110.

In order to maintain the light curable potting material 78 in the area of the window assembly 10, 10A, 10B, 10C that it is needed and desired prior to the potting material 78 being cured, a barrier 114, 114A, 114B, 114C, 114D may be utilized. The barrier 114, 114A, 114B, 114C, 114D prevents the light curable potting material 78 from flowing past it. For example, in an embodiment, the light curable potting material 78 is prevented from flowing past the barrier 114, 114A, 114B, 114C, 114D and beyond an outer edge 116 of the inner pane 16. The barrier 114, 114A, 114B, 114C, 114D is applied to and is in contact with the either the inner pane 16 or the outer pane 18 adjacent the one or more wire assemblies 64.

As shown in FIGS. 8-9, the barrier 114, 114A, 114B, 114C may be applied to the inner pane 16 or the outer pane 18 via an arm 118. The arm 118 may be retractable so that it can move toward or away from the pane 16, 18 as necessary to position the barrier 114, 114A, 114B, 114C. For example, as illustrated by FIG. 8, the arm 118 can position the barrier 114 so that it contacts the outer edge 116 of the inner pane 16. Alternatively, as illustrated by the embodiments shown in FIGS. 10-11, the barrier 114D may be applied manually. As shown best in FIG. 11, the barrier 114D may be applied so as to contact the outer edge 86 of the outer pane 18. In other embodiments like the one illustrated by FIG. 9, the barrier 114A may be utilized on and in contact with a major surface 22, 24, 26, 28 of the inner pane 16 or the outer pane 18. In this embodiment, the barrier 114A is positioned over the edge portion 38 of the pane 16, 18. After the barrier 114A is positioned as desired, the light curable potting material 78 can be disposed as described above.

Figure 10:
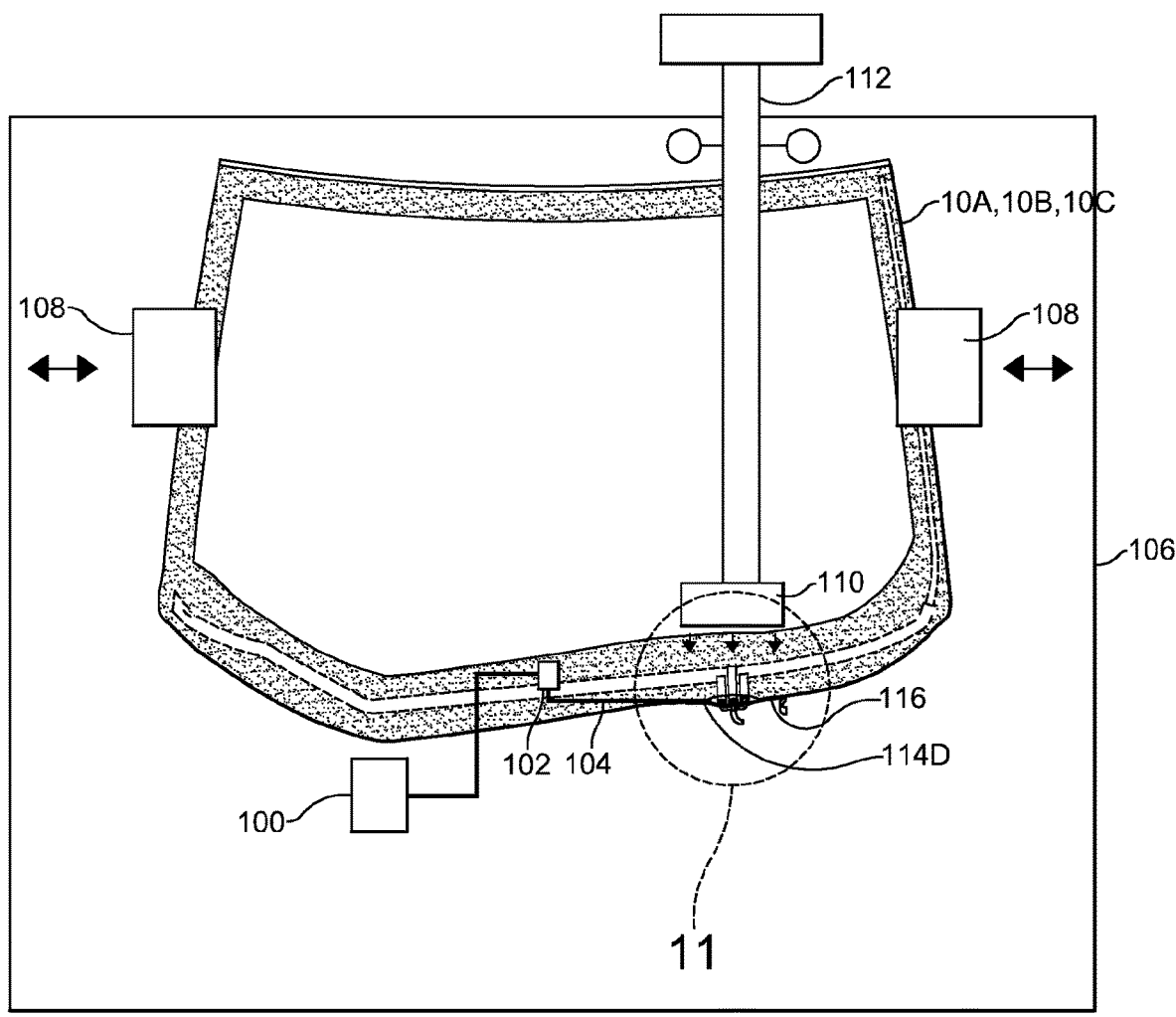
FIG. 10 is a plan view of another embodiment of a fixture utilized in the method of making certain embodiments of the window assembly of FIG. 1 in accordance with the invention.

In certain embodiments, the barrier 114, 114A, 114B, 114C, 114D is provided with a desired shape. For example, as illustrated in FIGS. 8 and 10, a portion of the barrier 114, 114D may be of a shape that is formed to engage a portion such as, for example, the outer edge 86, 116 of the inner pane 16 or the outer pane 18. In another embodiment like the one illustrated in FIG. 9, the barrier 114A may be provided with a central aperture 120 so that it can be positioned to surround a portion of each of the wire assemblies 64. In this embodiment, the barrier 114A may be ring-shaped. In other embodiments such as, for example, when the window assembly 10, 10A, 10B comprises the molding member 88, the barrier 114B may be of a semi-circular shape or U-shaped. In these embodiments, the molding member 88 may be utilized to prevent the light curable potting material 78 from flowing past it and beyond the outer edge 116 of the inner pane 16.

Figure 11:
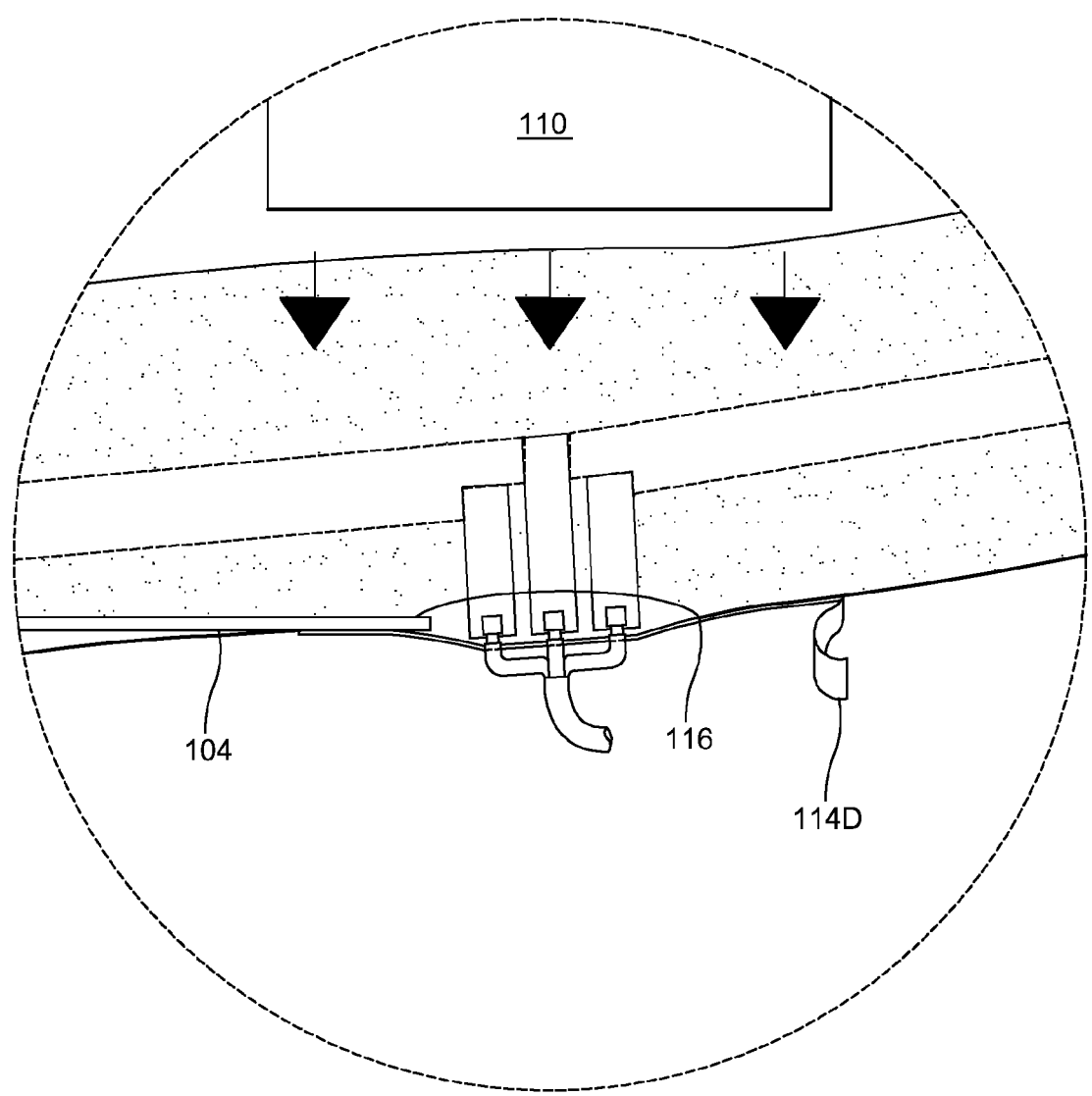
FIG. 11 is an enlarged view of a portion of the fixture and window assembly of FIG. 10.

In certain embodiments, it may be preferable that the barrier 114, 114A, 114B, 114C, 114D is formed from a material which is low cost. For example, in certain embodiments like the ones shown in FIGS. 6-7, the barrier 114B, 114C is formed from a foam material. In these embodiments, the foam barrier 114B, 114C may be permanently adhered to the light curable potting material 78 and the window assembly 10B, 10C. In other embodiments like the ones illustrated by FIGS. 4 and 5, the barrier is not permanently adhered to the light curable potting material 78. In one such embodiment, the barrier 114D is a removable tape as illustrated in FIGS. 10-11. In this embodiment, the removable tape may be, for example, a pressure sensitive adhesive tape. In another embodiment, the barrier 114, 114A, 114D may include a portion or a layer which is of a non-stick material such as, for example, the material sold under the trademark Teflon® by DuPont.

The light curable potting material 78 may also comprise a secondary cure mechanism. A secondary cure mechanism may be included in the light curable potting material 78 in order to provide an alternative cure mechanism should the light curable potting material 78 be partially or wholly shielded from exposure to the source of light 110. For example, the light curable potting material 78 may be partially or wholly shielded from the source of light 110 by the molding member 88 or another portion of the window assembly 10, 10A, 10B. It should be appreciated that if the light curable potting material 78 is partially or wholly shielded from the source of light 110, then the light curable potting material 78 may not be cured within a desired period of time such as, for example, five minutes or less. The secondary cure mechanism in the light curable potting material 78 can be selected to ensure that if the light curable potting material 78 is partially or wholly shielded from exposure to the source of UV light 110 that the light curable potting material 78 cures. Preferably, the secondary cure mechanism is selected to be one of an ambient moisture cure, a reactive system cure, or a thermal cure. In embodiments where the secondary cure mechanism is an ambient moisture cure mechanism, the light curable potting material 78 includes a urethane and/or a silicone material. In embodiments where the secondary cure mechanism is a reactive system cure mechanism, the light curable potting material 78 includes a urethane, silicone, epoxy, acrylic and/or a reactive hot melt material. In certain embodiments, the reactive system cure is a two component system.

The foregoing description is considered as illustrative only of the principles of the invention. Further, since numerous modifications and changes will readily occur to those skilled in the art, the invention may not be limited to the exact construction and processes shown and described herein. Accordingly, all suitable modifications and equivalents may be considered as falling within the scope of the invention.

What is claimed is:

1. A method of making a window assembly having an electrically heated portion comprising: providing a glass pane having a major surface; disposing an electrically conductive material over at least a portion of the major surface of the glass pane; attaching one or more wire assemblies to the electrically conductive material; and disposing a light curable potting material over the one or more wire assemblies such that the potting material covers a portion of each of the one or more wire assemblies and adheres to a portion of the major surface of the glass pane, wherein the light curable potting material flows over the one or more electrical wire assemblies and the major surface of the glass pane, exposing the light curable material to light provided by a source of light such that in 1 minute or less the light curable potting material has an outer surface that is in a parallel relationship with the major surface of the glass pane and is non-flowable in 5 minutes or less.

2. The method of claim 1, wherein the outer surface of the light curable potting material is substantially flat in 1 minute or less.

3. The method of claim 1, further comprising disposing a ceramic frit material on a peripheral portion of the major surface of the glass pane.

4. The method of claim 1, further comprising providing the source of light adjacent the glass pane and wherein the exposing of the light curable potting material to the light provided by the source of light for 60 seconds or less.

5. The method of claim 1, further comprising providing a barrier adjacent the one or more wire assemblies and in contact with the major surface of the glass pane or an outer edge of the glass pane and wherein the barrier prevents the flow of the light curable potting material beyond the outer edge of the at least one glass pane.

6. The method of claim 1, wherein the light curable potting material has an elongation at break of 100% or more after being exposed to the source of light.

7. The method of claim 1, further comprising disposing a primer directly on the major surface of the glass pane such that the primer promotes adhesion of the light curable potting material to the major surface of the glass pane.

8. The method of claim 1, further comprising providing a fixture which positions the at least one glass pane.

9. The method of claim 1, wherein the light curable potting material comprises a secondary cure mechanism and the secondary cure mechanism is one of ambient moisture or a reactive system.

10. The method of claim 1, further comprising adhering the light curable potting material to the portions of each of the one or more wire assemblies covered by the light curable potting material so that a seal to prevent the ingress of moisture is provided around the portions of each of the one or more wire assemblies covered by the light curable potting material.

11. The method of claim 1, wherein the light curable potting material is non-flowable in 2 minutes or less.

12. The method of claim 4, wherein the potting material has a modulus of elasticity of 500 MPa or less when exposed to an ambient temperature of −40° C. and after being exposed to the source of light.

13. The method of claim 4, wherein the light curable potting material is exposed to UV light provided by the source of light for 30 seconds or less.

14. The method of claim 5, wherein the barrier in contact with the major surface or the outer edge of the glass pane is removed from the major surface or the outer edge of the glass pane.

15. The method of claim 5, wherein a portion of the barrier is permanently adhered to the major surface or the outer edge of the glass pane.

16. The method of claim 5, wherein the barrier at least partially surrounds a portion of each of the one or more wire assemblies.

17. The method of claim 6, wherein the potting material has an elongation at break of 200% or more after being exposed to the source of light.

18. The method of claim 11, wherein the light curable potting material is non-flowable in 1 minute or less.

19. The method of claim 12, wherein the potting material has a modulus of elasticity of 200 MPa or less when exposed to an ambient temperature of −40° C. and after being exposed to the source of light.

20. The method of claim 1, wherein the light curable potting material has a viscosity of less than 40,000 centipoises before being exposed to the source of light.

21. The method of claim 1, wherein the one or more wire assemblies are soldered to a busbar.

22. The method of claim 1, wherein the light curable potting material is self-leveling.

23. The method of claim 1, wherein the portion of each of the one of or more wire assemblies covered by the light curable potting material is at least one of a portion of a terminal connector and an exposed portion of a conductive wire.

* * * * *